(12) United States Patent
Sanghvi et al.

(10) Patent No.: US 7,873,940 B2
(45) Date of Patent: *Jan. 18, 2011

(54) PROVIDING PACKAGES FOR CONFIGURING SOFTWARE STACKS

(75) Inventors: Ashvinkumar J. Sanghvi, Sammamish, WA (US); Giedrius Zizys, Redmond, WA (US); Vij Rajarajan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1179 days.

This patent is subject to a terminal disclaimer.

(21) Appl. No.: 11/379,973

(22) Filed: Apr. 24, 2006

(65) Prior Publication Data

US 2007/0261018 A1 Nov. 8, 2007

(51) Int. Cl.
*G06F 9/44* (2006.01)
(52) U.S. Cl. .................................................. 717/102
(58) Field of Classification Search ................ 717/117, 717/168, 172, 100–103
See application file for complete search history.

(56) References Cited

U.S. PATENT DOCUMENTS

| | | | |
|---|---|---|---|
| 5,414,843 A | | 5/1995 | Nakamura et al. |
| 5,848,394 A | | 12/1998 | D'Arrigo et al. |
| 6,199,204 B1 * | | 3/2001 | Donohue .................... 717/178 |
| 6,208,345 B1 | | 3/2001 | Sheard et al. |
| 6,298,476 B1 | | 10/2001 | Misheski et al. |
| 6,678,696 B1 | | 1/2004 | Helland et al. |
| 7,013,461 B2 * | | 3/2006 | Hellerstein et al. .......... 717/177 |
| 7,082,527 B2 * | | 7/2006 | Zimmer et al. .................. 713/2 |
| 2002/0133814 A1 * | | 9/2002 | Bourke-Dunphy et al. .. 717/174 |
| 2002/0138321 A1 | | 9/2002 | Yuan et al. |
| 2002/0144248 A1 * | | 10/2002 | Forbes et al. ................. 717/167 |
| 2003/0159137 A1 * | | 8/2003 | Drake et al. ................. 717/172 |

(Continued)

FOREIGN PATENT DOCUMENTS

WO WO 2004/086222 A 10/2004

(Continued)

OTHER PUBLICATIONS

Carla Sadtler et al, "IBM WebSphere Application Server V5.1 System Management and Configuration", Apr. 2004,IBM RedBook, [Websphere.pdf] pp. 3, 17, 51, 55-56, 64, 73, 75, 76-82, 96, 210-215, 217-222, 303-305, 478, 549-500, 555-559, 560-562.*

(Continued)

*Primary Examiner*—Anna Deng
(74) *Attorney, Agent, or Firm*—L. Alan Collins; Collins & Collins Incorporated

(57) ABSTRACT

Described is sharing of portable packages containing encodings of processes. The packages can be provided to and shared among organizations or firms so that the packages can be applied to their software stacks. The packages are portable and distinct from the technology stacks. The packages can cross reference each other. The packages may be in the form of declarative code for configuring the technology stacks and can be plugged into the technology stacks to allow the technology stack to play the packages, thereby automating the processes encoded by the packages. The packages can be digitally signed or provided with certificates that can be used to verify their authenticity. The packages can be distributed over a network as requested by the various firms or organizations.

18 Claims, 12 Drawing Sheets

U.S. PATENT DOCUMENTS

| | | | |
|---|---|---|---|
| 2004/0078105 A1 | 4/2004 | Moon et al. | |
| 2004/0078777 A1 | 4/2004 | Bahrami | |
| 2004/0111284 A1 | 6/2004 | Uijttenbroek | |
| 2004/0255110 A1* | 12/2004 | Zimmer et al. | 713/2 |
| 2004/0267911 A1* | 12/2004 | Alam | 709/220 |
| 2005/0044173 A1 | 2/2005 | Olander et al. | |
| 2005/0096937 A1 | 5/2005 | Subash et al. | |
| 2005/0159828 A1 | 7/2005 | Deininger et al. | |
| 2006/0059029 A1* | 3/2006 | Chalasani et al. | 705/8 |
| 2006/0179058 A1* | 8/2006 | Bram et al. | 707/9 |
| 2006/0230314 A1* | 10/2006 | Sanjar et al. | 714/26 |
| 2006/0291664 A1* | 12/2006 | Suarez et al. | 380/286 |
| 2007/0083588 A1* | 4/2007 | Keller et al. | 709/202 |
| 2007/0261017 A1* | 11/2007 | Sanghvi et al. | 717/100 |

FOREIGN PATENT DOCUMENTS

| | | |
|---|---|---|
| WO | WO 2005/069125 A | 7/2005 |

OTHER PUBLICATIONS

"International Search Report PCT/US2007/005798" Aug. 31, 2007, pp. 1-7.

Glen B. Alleman "Agile Project Management Methods For IT Projects", Chapter X in "The Story of Managing Projects: A Global, Cross Disciplinary Collection of Perspectives", Editors: Dr. E.G. Carayannis and Dr. Y. H. Kwak, Greenwood Press/Quorum Books, 2002.

Microsoft Corporation "Microsoft TechNet—Microsoft Solutions Framework", retrieved on Nov. 30, 2005.

Information Services Board "Welcome to the Project Management Framework (Guidelines)", retrieved on Nov. 30, 2005.

Treasury Board of Canada "An Enhanced Framework for the Management of Information Technology Projects", retrieved on Nov. 30, 2005.

* cited by examiner

350

```xml
<!-- MyWorkflow.xaml -->
<SequenceActivity
x:Class="MyNamespace.MyWorkflow"
xmlns="http://schemas.microsoft.com/winfx/2006/xaml/workflow"
xmlns:x="http://schemas.microsoft.com/winfx/2006/xaml"
xmlns:my="http://schemas.example.org/MyStuff"
>
   <IfElseActivity>
      <IfElseBranchActivity>
         <IfElseBranchActivity.Condition>
            <CodeCondition Condition="Is05"/>
         </IfElseBranchActivity.Condition>
         <my:WriteLine Text="Circa-Whidbey"/>
      </IfElseBranchActivity>
      <IfElseBranchActivity>
         <IfElseBranchActivity.Condition>
            <CodeCondition Condition="Is06"/>
         </IfElseBranchActivity.Condition>
         <my:WriteLine Text="Circa-Vista"/>
      </IfElseBranchActivity>
      <IfElseBranchActivity>
         <my:WriteLine Text="Unknown Era"/>
      </IfElseBranchActivity>
   </IfElseActivity>
</SequenceActivity>
```

FIG. 11

United States Patent US 7,873,940 B2

PROVIDING PACKAGES FOR CONFIGURING SOFTWARE STACKS

CROSS-REFERENCE TO RELATED APPLICATIONS

This application is related to U.S. patent application Ser. No. 11/379,964, filed Apr. 24, 2006; and is related to U.S. patent application Ser. No. 11/379,968, filed Apr. 24, 2006; and is related to U.S. patent application Ser. No. 11/379,974, filed Apr. 24, 2006.

BACKGROUND

A number of different entities have compiled guides on Information Technology (IT) management processes. For example, IBM publishes the Redbook series. The United Kingdom's IT Information Library (ITIL) describes vendor-independent preferred practices for managing IT services. Microsoft provides the Microsoft Operations Framework (MOF), which applies ITIL guidelines to specific software products. Some organizations may have their own custom IT practices and procedures which often include both human activity and automation. In general, there exist many different preferred practices for managing IT systems and services. Some of these practices relate, for example, to managing change in an IT system, reporting and responding to IT incidents, and so on.

It has turned out that many IT departments have had problems putting formal IT management processes into practice. Some IT departments may spend several years implementing an ITIL process. There can be technical problems, such as lack of infrastructure necessary to support process automation. A Configuration Management Database (CMDB) might be needed or a new application may need to be deployed on users' computers. There can also be human problems such as learning about a new process, retraining personnel, disseminating information, deciding on implementation details, and so on. Generally, these kinds of problems might partly explain why the IT industry has been slow to adapt or automate preferred or formal IT management practices.

Of course, these same problems might be faced by the IT departments of many different firms or organizations. There might be significant duplication of effort. Consider a scenario where two different IT departments wish to implement a same business process or IT management process on their respective IT systems, for example, an asset acquisition process. The departments must go through roughly the same steps of learning about and understanding the acquisition process (e.g. accounting details, chains of approval, correspondence, etc.), configuring their technology to accommodate the new process, providing knowledge to IT users and IT administrators about how the process will be implemented, and so on. Currently, there is no way for an IT department to efficiently or automatically implement a preferred IT management process. Furthermore, there is no way for people to share encodings of IT or business processes in a way that is separated from underlying technology for automating such processes.

SUMMARY

The following summary is included only to introduce some concepts discussed in the Detailed Description below. This summary is not comprehensive and is not intended to delineate the scope of protectable subject matter, which is set forth by the claims presented at the end.

Described below are aspects of sharing portable packages containing encodings of processes. The packages can be provided to and shared among organizations or firms so that the packages can be applied to their software stacks. The packages are portable and distinct from the technology stacks. The packages can cross reference each other. The packages may be in the form of declarative code for configuring the technology stacks and can be plugged into the technology stacks to allow the technology stack to play the packages, thereby automating the processes encoded by the packages. The packages can be digitally signed or provided with certificates that can be used to verify their authenticity. The packages can be distributed over a network as requested by the various firms or organizations.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

FIG. 11 shows markup for declaratively defining a workflow.

DETAILED DESCRIPTION

Overview

The following description begins with a discussion of a typical IT system and a brief discussion of a stack of software services or components available on the IT system. This will be followed by a description of a process package and how a process package can be "played" on a technology stack, that is to say, used to automate a business or IT process on the IT infrastructure. Components of a software service stack and their properties will then be discussed in more detail. Other aspects of packages will then be discussed.

IT System or Infrastructure

The term Information Technology (IT) broadly concerns technology and in particular aspects of managing and processing information, especially in large organizations. IT involves the use of computers and computer software to store, process, transmit, and retrieve information. The IT infrastructure or system of an organization refers to the assets, primarily the IT services provided to the organization, as well as the hardware and software (artifacts) that are used to provide IT services to the organization. Typically, a large IT infrastructure will be managed by a dedicated staff or department.

Figure 1:
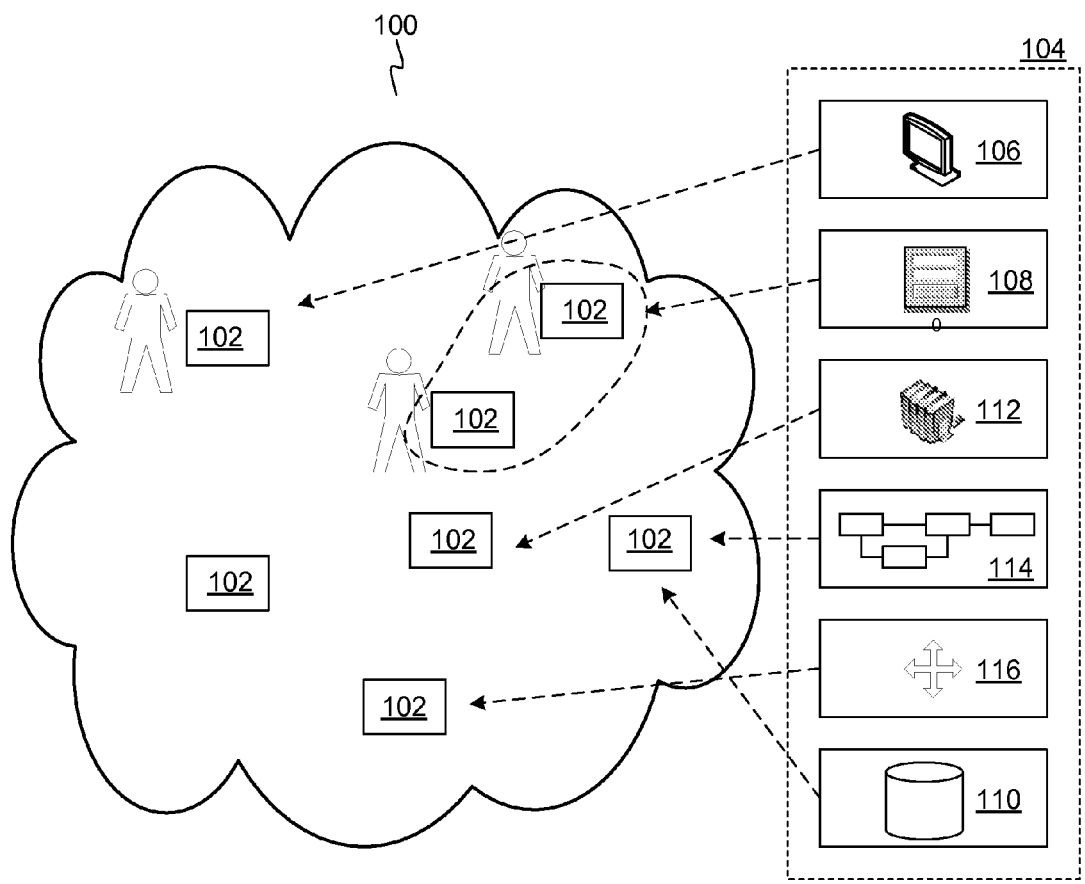
FIG. 1 shows an example IT system.

FIG. 1 shows an example IT system 100. The IT system 100 has a number of hardware and software artifacts 102. Examples of hardware artifacts are servers, network equipment such as routers, bridges, backbones, cables, workstations, mobile devices, PCs, peripheral devices such as printers, perhaps telephony equipment, and others too numerous to list. Examples of software artifacts are database servers, desktop applications, web servers, web portals, file servers, email servers, IT management software, productivity suites, accounting packages, and a nearly unlimited variety of other software services which are often deployed and managed by an IT department.

FIG. 1 also shows an example technology stack 104. A technology stack can be thought of as software services or products in an IT infrastructure which are loosely linked and are capable of cooperating or communicating with each other to provide overall IT service and to manage and maintain overall IT service. That is, the technology stack serves utility and function in the IT infrastructure. In the example technology stack 104 shown in FIG. 1, the technology stack 104 has a number of components 106-116, which are distributed throughout the IT infrastructure 100. In no order of importance, these components are discussed below in general and are discussed in greater detail further below (see the section titled "TECHNOLOGY STACK").

The example technology stack 104 has a self-service portal 106, which typically serves as a starting point or gateway for employees of an organization to access corporate information and applications. Although typically embodied as a web portal, the self-service portal 106 may take other forms as well. The self-service portal 106 can be realized using products from any of various software vendors. For example, current or future version of Microsoft's SharePoint Portal Server may be used for core portal functionality. Other products such as SQL Server can be used to supply reporting services and the like. IBM's WebSphere Portal is another example of a product that can be used for the self-service portal 106.

The technology stack 104 also includes a forms framework 108. The forms framework 108 is some framework widely available across the IT system 100. As the name implies, the forms framework 108 is for filling out, in form-like fashion, information about some work item such as an artifact, a task, etc. A very basic form typically has fields, perhaps sized and typed, and may be coupled to some backend datasource for storing or backfilling form fields. A form in the form framework 108 may also be interactive, that is, it may involve more than simply filling out field forms. Lightweight logic or rules for data integrity may also be present in a form. A wide variety of off-the-shelf products may be used to implement the forms framework 108. For example, Office 12, from Microsoft Corporation, or IBM's Workplace Forms, or others may be used. Preferably, the forms framework 108 will allow forms to be displayed in a variety of ways, for example, a form might be a direct user interface (e.g., a SharePoint or InfoPath form) or a form might be popped up in an application such as Microsoft Outlook, in a word processor, etc. Data entered by a user via the forms framework 108 will usually be persisted, possibly in one or more databases or in a dedicated artifact store 110 (discussed below). Forms in the forms framework 108 may be driven by other components in the technology stack 104, and data entered through the forms framework 108 may affect other components in the technology stack 104.

The technology stack 104 may also have a knowledge source, repository or framework 112. The knowledge framework 112 is a service or set of applications that are used to manage knowledge. The knowledge framework 112 may provide functions such as storing and indexing articles and documents, searching for knowledge, cross-referencing or linking related documents, metadata tagging, cataloging, and so on. The knowledge framework 112 may be thought of as a system that allows ongoing capture of and access to an organization's knowledge. Preferably, users can query and browse the stored knowledge, which may be either structured or unstructured information. Addressable portions of knowledge may be desirable (e.g., URIs to documents). Troubleshooting guides, articles, white papers, user manuals, procedure documents, etc., are examples of some types of knowledge that might be found in the knowledge framework 112. Examples of products that can be used for the knowledge framework 112 include Microsoft's Office 12, Factiva, Interwoven's Worksite suite, or others.

A workflow engine or framework 114 is also part of the IT system 100's technology stack 104. The workflow framework 114 allows creation, execution and monitoring of automated workflows. For most workflow products, workflows consist of flow, perhaps conditional, between various discrete activities. The course of activity may depend on conditional events. Workflows can range from simple incident handling automation, to user defined, long running and complex workflows. A workflow is typically some description of what triggers a particular instance of a workflow, how the work flows through, and the activities that carry out the workflow. As will be discussed in detail later, workflows can be triggered by a state change event in another connected system or technology stack component. Furthermore, because artifacts may be linked by links provided by a link framework 116 (discussed below), workflow activities (the "nodes" in a workflow) can manipulate those artifacts or access those artifacts through an interface, for example, a web service. This can enable scenarios such as an IT management system alert creating an incident workflow that handles the life cycle of an IT incident.

There are many commercial products that can be used for the workflow framework 114. For example, the Windows Workflow Foundation (WWF) provides a Windows based workflow engine for executing workflows and Microsoft Office (Visio) allows graphical construction of workflows. Skelta sells a .Net based workflow framework. A java based open source workflow engine can also be used; see JBoss jBPM.

Another component in the example technology stack 104 is a link service or link framework 116. The link framework 116 helps tie together the various components in the technology stack 104. The link framework 116 allows linking, exchanging, or synchronizing, and mapping of artifacts. For example, the link framework 116 may link development platforms with IT management platforms such as Microsoft Operations Management (MOM) or Systems Management Server (SMS). Links in the link framework 116 allow automated workflows to be triggered by and manipulate related artifacts in linked systems. One example of a linking product that can be used is Microsoft's Team Foundation Server (TFS), which allows stack components to register their artifacts and relationships with a link server. If TFS is used, artifacts available via a web service, for example, can be used by the link framework 116, which can maintain relationships and locations of these artifacts.

The technology stack 104 preferably includes an artifact store 110, typically a Configuration Management Database (CMDB). The CMDB primarily serves the function of keeping a record of IT items and tracks their relationships with each other. Most IT management activity reasons over the artifact store 110 for making decisions and for sharing information about things in the IT system 100. Preferably, the artifact store 110 is based on the System Definition Model (SDM) language, which facilitates modeling types of artifacts and relationships between them, and which also facilitates interaction with other SDM based components such as MOM and SMS. A CMDB type of artifact store 110 is discussed in greater detail further below.

The technology stack 104 is only an example of one possible technology stack that an IT system might have. Other IT systems might have a different set of components. Furthermore, the components can be realized with any variety of commercially available software products from any vendor. The components can be distributed across many different computers in the IT system (e.g., forms framework 108, self-service portal 106, etc.). Some components may be installed and run on one computer or server (e.g., knowledge framework 112, artifact store 110, etc.). Some may be hosted on a same server. The installation configuration is not important. Rather, what is relevant is the availability of the various technology components and their ability to communicate with each other. Furthermore, the components may be capable of autonomous operation for their respective functions. That is, the workflow framework 114, for example, can provide workflow functionality to users without requiring other components in the technology stack 104. Or, the forms framework 108 might have forms that exist and are operate separate from other components, while at the same time it might have forms that, as explained below, interoperate with other technology stack 104 components. The technology stack 104 is a collection of autonomous components that are capable of loose federation or interoperation (perhaps indirectly or as facilitated by the link framework 116) but which also provide stand-alone functionality.

Packages

Figure 2:
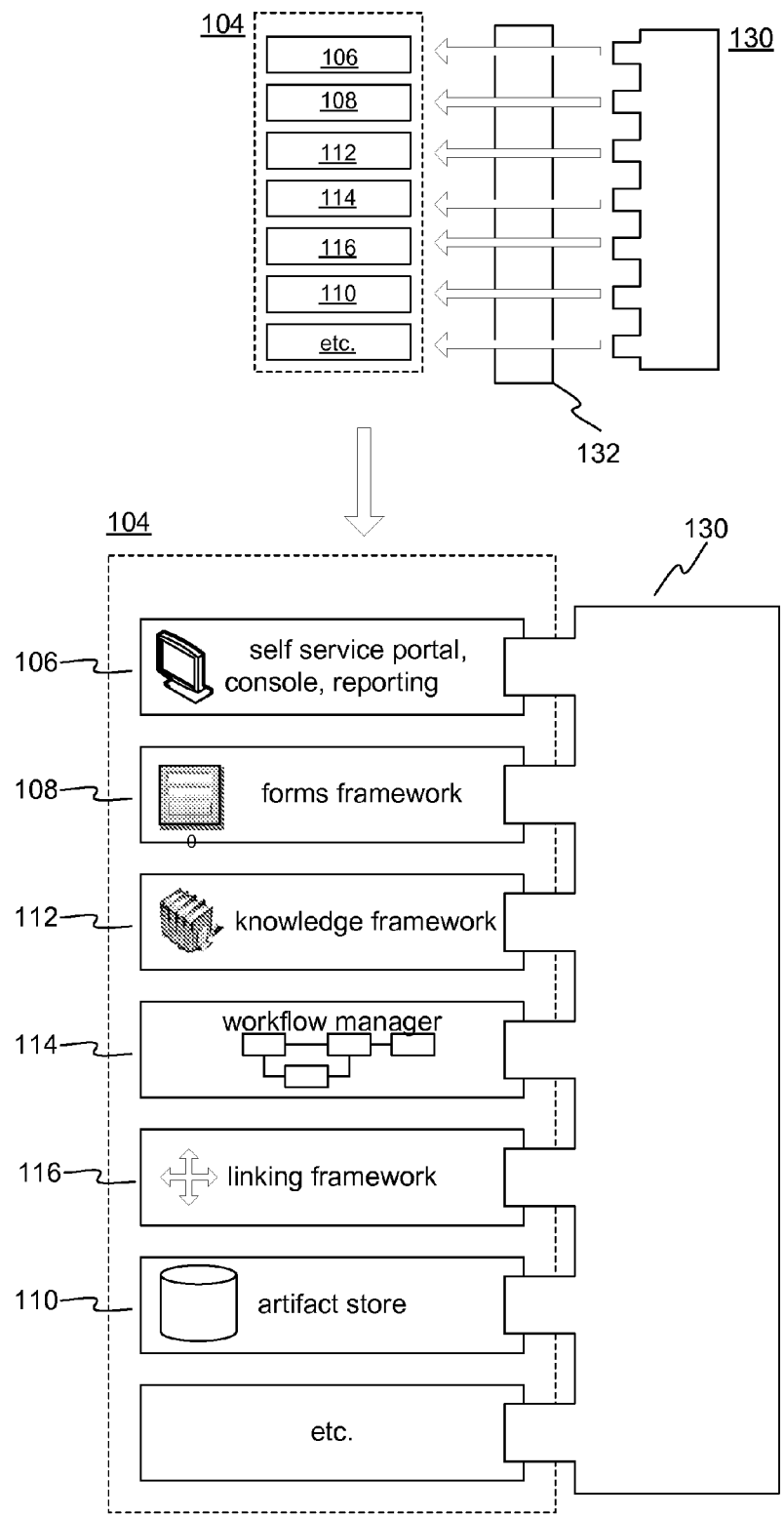
FIG. 2 shows a package.

FIG. 2 shows a package 130. Given any technology stack such as example technology stack 104, package 130 can be used to control the technology stack. Package 130 includes an encoding, preferably declarative, of a configuration of the technology stack; the package is interpreted by and controls the technology stack. More specifically, the package 130 is an encoding of a process and includes related information such as metadata used by the stack to implement the process. The package 130 in effect can be "plugged in" to the technology stack and "played" by the technology stack. The package 130 is loosely analogous to a DVD; it can be plugged into a player (the technology stack) and its process can be played by the technology stack.

As discussed in the Background, interpreting IT or business processes from paper or human knowledge can be error prone, and automating processes so that they work with existing management tools can be so complex that it can take years to implement and may be costly to maintain. Package 130 allows a technology-neutral IT or business process to be encoded into a portable, machine-usable, extensible form. Thus, if different IT systems (and different respective technology stacks) have a same package, the process encoded in that package can be implemented (automated) at the different IT systems. The package approach allows separation of the technology stack (which implements a process) from information in the package that configures the technology stack to perform the package's process. As discussed later, the package preferably contains declarative information that configures and controls stack components to cooperatively perform a process. For example, a package might contain: workflow information defining various human or automated steps in the package's process; artifact schemas and relationship types for plugging into the artifact store 110; knowledge articles or instructions intended for the people involved in the process, which can be stored in the knowledge framework 112; role definitions; views, forms, and reports; configuration items which represent objects such as services, assets, users, locations, organizations, and so on.

Figure 5:
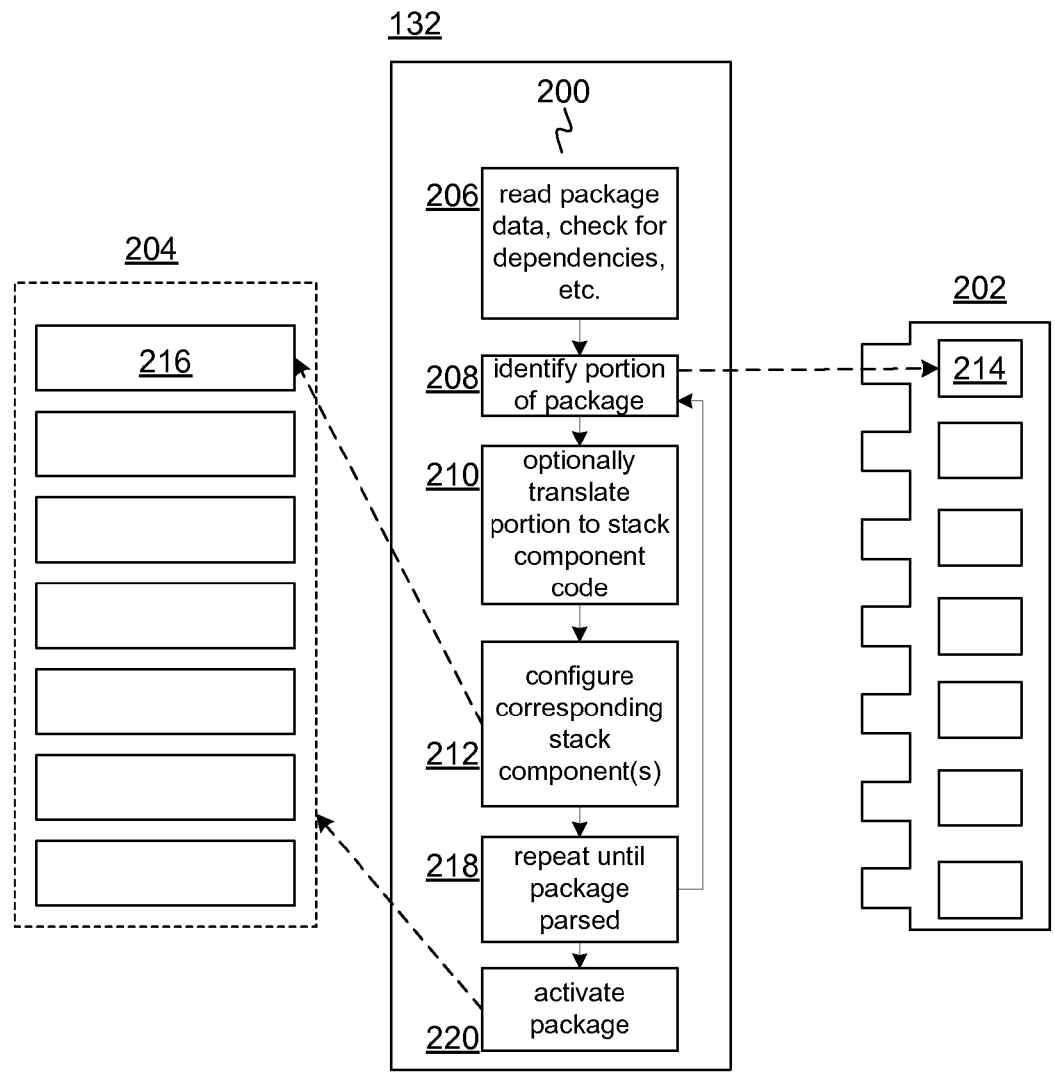
FIG. 5 shows a process that an application may perform to load a package into a technology stack.

The content of package 130 is preferably declarative configuration information and metadata, parts of which may be directed to and interpreted by various corresponding components in the technology stack 104 (see FIG. 5). Regardless of the form of the content of package 130, a program or application 132 reads the package 130 and plugs it in to the technology stack 104. Once plugged in (lower portion of FIG. 2), the technology stack can begin to automate the business or IT process encoded in the package 130, i.e., "play" the package.

Figure 3:
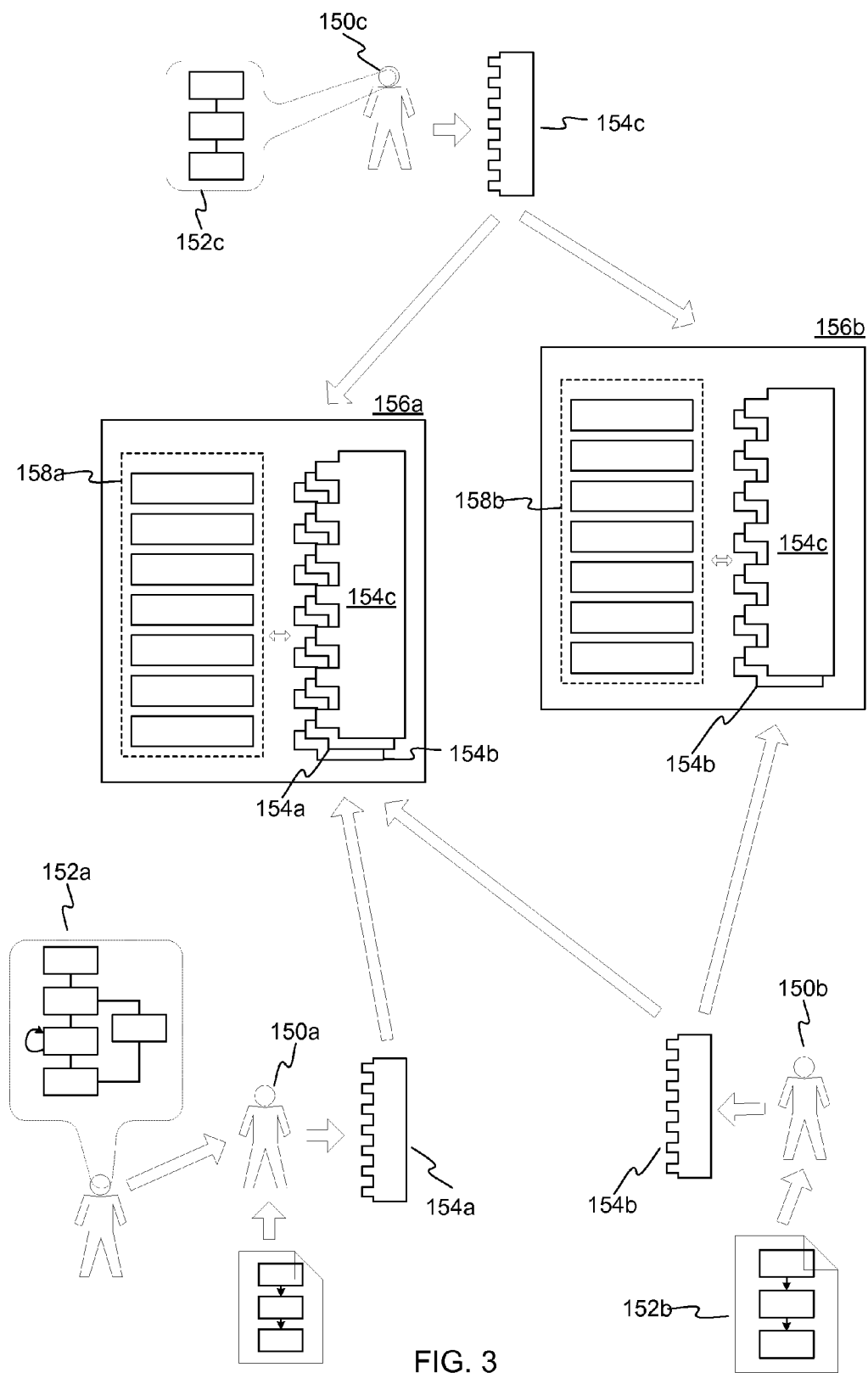
FIG. 3 shows how packages can be used to share processes.

FIG. 3 shows how packages can be used to share processes. A number of different organizations, persons, or entities 150a, 150b, 150c may encode processes 152a, 152b, 152c into packages 154a, 154b, 154c. An entity 150a, 150b, 150c might be a firm that specializes in automating business or IT processes. An entity might be an IT department or personnel thereof, which might be encoding an IT management process for that department. One process, such as process 152a, might be an informally understood or partially documented process, where much of the process is the personal knowledge of one or more persons, or another part of the process might be loosely documented. Another process, such as process 152b, might be a documented process of the type typically found in ITIL, MOF, IBM Redbook series, IT department documentation, and so on. Another such as process 152c might be developed or designed impromptu while encoding it in package 152c. In any case, packages 154a, 154b, 154c are portable encodings, preferably declarative, of processes or procedures that can be shared among different organizations.

FIG. 3 also shows two separate and autonomous IT systems 156a, 156b, possibly corresponding to different organizations, businesses, firms, etc. Each IT system 156a, 156b has a corresponding technology stack 158a, 158b. The technology stacks 158a, 158b are similar to technology stack 104 as discussed above, but may have different sets of components and possibly different products performing similar functions or standing in the place of the various stack components. For example, technology stack 158a might use Microsoft's WWF for workflow management and technology stack 158b might use an open source workflow engine.

As shown in FIG. 3, packages 154a, 154b, 154c can be distributed, shared, and played at different IT systems 156a, 156b to enable the technology stacks 158a, 158b to carry out the processes 152a, 152b, 152c. The packages 154a, 154b, 154c can be distributed electronically by network transmission, physically by distribution of physical storage media, or pre-installed as part of an IT management system, etc. Either way, once a package is received, the package can be plugged in and played on the receiver's technology stack, thus automating the corresponding process. In the example of FIG. 3, technology stack 158a is playing packages 154a, 154b, and 154c. Technology stack 158b is playing packages 154b, 154c. It can be seen that different processes can be encoded by one entity and yet efficiently shared and automated ("played") by many different entities. Furthermore, as will be discussed later with reference to FIG. 4, if needed, any of the packages 154a, 154b, 154c can reference any of the other packages 154a, 154b, 154c and therefore can use work items, or classes, or data files (e.g., knowledge articles), or any information derived from a cross-referenced package.

Note that each IT system 156a, 156b should have the ability to plug any packages into their respective technology stacks 158a, 158b. Although a stand alone program such as application 132 can be used, similar functionality can be provided as part of a component of the technology stacks 158a, 158b. A consolidated service desk (CSD) is an ideal location for providing such functionality. In fact, the application 132 can be a CSD application.

Figure 4:
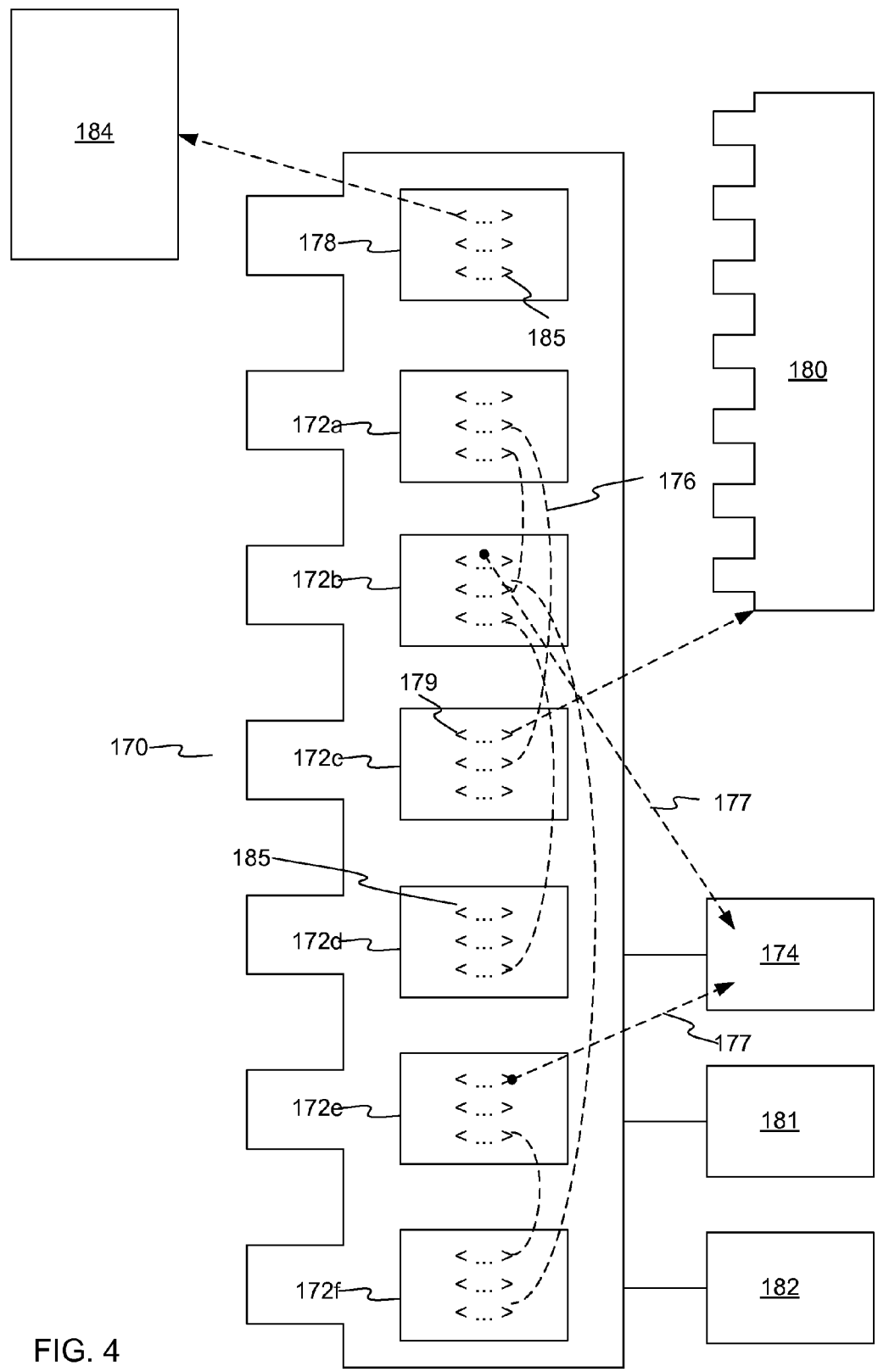
FIG. 4 shows an example package.

FIG. 4 shows an example package 170. In one embodiment, package 170 has code portions 172a-172f that correspond to respective components in a technology stack. For example, code portions 172a-172f could correspond to components 106-116 in technology stack 104 (FIG. 2). However, it should be noted that a package can have code portions corresponding only to a subset of stack components which are used by a process encoded by such package; a package need not use each component in the technology stack. More complex and structured processes have encoding packages that tend to touch a greater number of stack components. Assuming that the example package 170 is directed to technology stack 104, then each code portion 172a-172f will have code that can be plugged in to its corresponding technology stack component. If the process encoded in package 170 is an IT asset acquisition process, for example, then code portion 172a might declare types/classes and instances of self-service portal objects for inquiring into the status of a request or for initiating a request. Code portion 172b might declaratively describe forms for a user to enter data related to a request, for example, an approval form for approving a request. Code portion 172c might define, for the artifact store 110, classes of objects related to a request for which instances might be stored in the artifact store 110. For example, a work item or work order, an artifact being requested (e.g., a software package, a computer, etc.), or roles such as "requester", "approver", "accounting department", etc. Code portion 172d might instruct inclusion of some knowledge 174 attached to the package 170. Knowledge 174 might include electronic documents, media such as an instructional video, or even modifications or updates to an existing document in the knowledge framework 112, such as new hyperlinks to knowledge 174, new text, or other similar information.

In the example package 170, code portion 172e would define an overall workflow for the process, for example, an asset acquisition workflow. The code portion 172e would declare activities and events and/or conditions for flow between activities. Code portion 172f would declare links to be added to the linking framework 116. For example, it might declare that an alert from an IT management system (e.g., MOM) is linked to a problem or artifact stored in the artifact store 110. Any data in any stack component can potentially be linked to another data item in another stack component.

As indicated by dashed lines 176 in FIG. 4, any of the code portions 172a-172f might have references to classes or objects or other information declared in another portion 172a-172f. Also noted above, a code portion might also have a link or reference 177 to some bits or hard data attached to or included with package 170, such as knowledge 174. Such hard data can also include software libraries, source code or "code-beside" that adds supplemental logic to one of the code portions 172a-172f, or even upgrade packs for upgrading technology stack components to be compatible with the package 170 or one or more code portions 172a-172f.

A package such as package 170 will preferably include some information applicable to the entire package 170, which will be referred to as global data or package data 178. The package data 178 might indicate a master or container schema defining the format of packages such as packages 154a, 154b, 154c and package 170. The package data 178 might identify the package 170 by providing a name or globally unique identifier or other identity information. The package data 178 may define a namespace for the package 170, identify a version of the package 170, identify a publisher or author of the package 170, contain authenticity and integrity information (e.g., encrypted checksums, public keys or authenticity certificates, etc.), or other information of a global nature. The package data 178 might also include dependency information such as a dependency 179 on another package 180, platforms that are required, stack components and versions thereof that are needed, etc. The package data 178 might also serve as a manifest listing parts of the package 170 such as distribution data 181 or installation data 182. In one embodiment, package 170 can optionally be formed as a cabinet file (i.e., CAB file), a Microsoft Windows Installer (MSI) package, or some other distribution package format.

In one embodiment, package 170 is a structured document formatted according to a package schema 184, which might be an XML schema definition file (XSD file) or some other type of schema file. As mentioned above, the package schema 184 might be attached to or wrapped around the package 170, although this is not required. In an XML-based embodiment, the code portions 172a-172f and package data 178 consist of XML markup or tags 185 formatted and arranged according to the package schema 184. In this embodiment, the code portions 172a-172f might be translated to component-specific code by the loading application 132.

In another embodiment, the package 170 is also a structured document formatted according to a package schema 182. However, the code portions 172a-172f are snippets of code specific to corresponding technology stack components and may not need to be translated, although macro-expansion (i.e., compiler-like preprocessing) may be helpful to ensure that parameters, macros, named objects, etc. are specific to the package 170 or the technology stack on which it will be played.

In any embodiments, packages may be implemented using a language such as the extensible Markup Language (XML), derivatives thereof, or other languages. Some portions might be implemented using the System Definition Modeling Language (SDM), for example, definitions of artifacts to be stored in an artifact store. In cases where the technology stack components have APIs and/or object models that accessible via declarative code, then a package's code portions can be plugged directly into corresponding stack components. In cases where the technology stack has a component that does not provide standardized declarative access (e.g., a component-specific XML schema), then package code for that component may be written specifically for that component or may be written in a modeling language (e.g., SDM) or another language possibly defined by package schema 184. Such code can be translated by application 132 into code that is specific to the corresponding component.

Regarding the nature of the information captured in a package, it should be noted that many types of processes can be encoded in a package. Unstructured processes (e.g., processes with single or unordered activities) can be encoded, for example: communication and collaboration processes; use, rating, and updating of knowledge and training; browsing of diagnostics and debugging applications; chatting with end users while resolving IT issues; web based self-services; reporting; looking up IT incidents and service status of IT incidents; notification of IT system changes; filling out surveys, running reports on usage, availability, and compliance with Service Level Agreements (SLAs); and others. Structured processes with prolonged state persistence (e.g., days, weeks, months, even years), possibly long intervals between activities, and highly structured flow between activities, can also be encoded. Examples of structured processes include: work item lifecycle such as routing and escalation; authorizations and approvals including possibly accounting activities; asset life cycle processes such as receipt, testing, deployment, and retirement; change management life cycle processes; knowledge life cycle; and others. Although IT management processes are well suited to packaging because they often are designed with the assumption that various IT resources are available, other non-IT processes can also be packaged. Accounting processes, insurance claim handling processes, and other business processes can also be packaged.

Loader/Controller Application

As discussed above with reference to FIG. 2, an application 132 may be used to load a package into a technology stack that then plays the package. FIG. 5 shows a process 200 that application 132 may perform to load a package 202 into a technology stack 204. Initially, the application 132 reads 206 the package 202 and checks for global or package data (e.g., package data 178). Based on the package data, the application 132 may determine if dependencies of the package 202 are satisfied. For example, the application 132 may verify that technology stack components exist and/or are of sufficient version level. The application 132 might also check to verify that any cross-referenced packages are either installed in the technology stack 204 or are available to be installed. At the initial reading 206, the application might also load any necessary schemas, check namespaces, or in other ways prepare to plug in the package 202.

After the global package data has been read 206 and processed, the application 132 then identifies 208 a portion of the package 202 that is directed to a technology stack component. For example, the application 132, when parsing the package 202, might read a tag that identifies or demarks a code portion, for example, one of code portions 172a-172f. If necessary, the node, element, or code portion so identified 208, may be translated 210 into a format or language dictated by the stack component to which the code portion is directed. As mentioned above, for technology stacks that can be programmed/configured directly using a standard declarative language (e.g., SDM, XAML, etc.), the code portions of the packages for such stacks can be plugged directly in to the corresponding stack components. In either case, the identified 208 and possibly translated 210 code portion is then used to configure 212 the appropriate technology stack component. That is to say, the portion of the package 202 is plugged in to its technology stack component. For example, if the identified 208 portion is a workflow definition, then the workflow framework 114 is configured 212 with the workflow definition. If the identified 208 portion is for the artifact store 110 and defines classes and/or instances of objects, then the artifact store when configured 212 with the portion may become capable of storing objects of the defined classes or types. If the identified 208 portion is portal information 214 defining a portal for the package 202, then a portal component 216 may be configured 212 to provide the defined portal. Furthermore, parts of a code portion may be plugged in to more than one component, for example, to configure them with necessary types of object classes, work items, links, or other data.

The process of identifying 208, possibly translating 210, and configuring 212 is repeated 218 until the entire package 202 has been parsed. Assuming that the package 202 was loaded or plugged in without any fatal errors, the application 132 may then begin "playing" of the package 132 by activating 220 the package 202 on the technology stack 204. This might involve verifying that the package 202 or the code portions have all been successfully loaded, enabling the workflow framework to begin handling instances of a workflow defined by the package 202, and possibly signaling for the restarting, resetting, or rebooting of stack components.

Although not shown with flowcharts, the application 132 may have other primary functions. For example, it may also "stop" the "playing" of packages either by disabling their workflows or by unloading the enabling code from the stack components. The application 132 can also monitor the status of a package by analyzing error messages or error logs of the various stack components. Again, the functionality of the example application 132 can reside anywhere and need not be delegated to a dedicated program. The application 132 may also serve as a general Consolidated Service Desk application.

Figure 6:
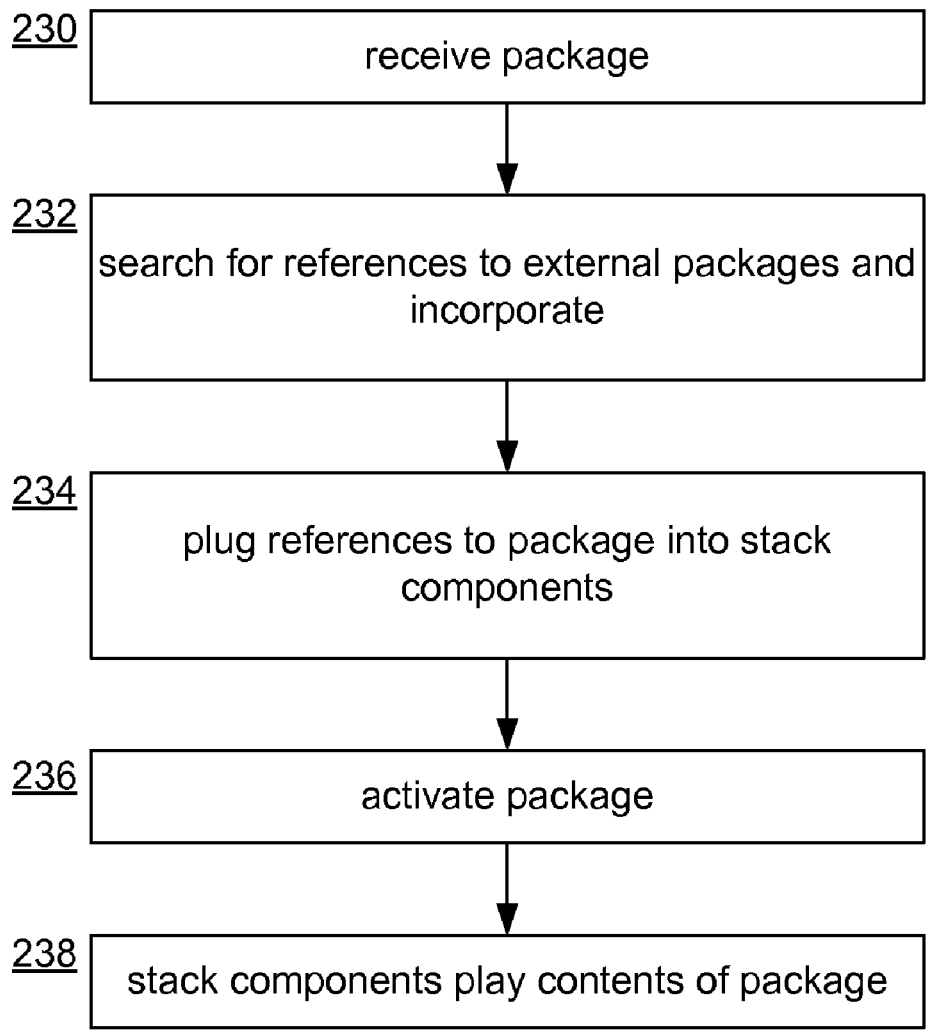
FIG. 6 shows another process for plugging in a package.

FIG. 6 shows another process for plugging in a package. Any arbitrary package from any arbitrary source is received 230. The package is searched 232 for references to other packages which may either be installed or plugged in 234 separately, incorporated into the received 232 package, or verified as currently "playing" on the technology stack. The package is then activated 236, after which the stack components play 238 their respective portions of content from the package and interoperate as needed.

Technology Stack

Once configured with a package, a technology stack begins automating the process encoded by the package, i.e., playing or executing the package. The autonomous components of the technology stack perform their usual functions, but the components are now configured such that those functions together automate the process encoded by the package. Components need not have awareness of other components. For example, a workflow engine need not know that a particular workflow is affected by a form in a form framework, for example.

For a simple or unstructured process, a minimal amount of activity may occur on the technology stack components. For example, a simple package-encoded process of notifying users of a change to an IT system might involve little more than a user initiating a change notice at a self-service portal, which may invoke a trigger at a backend database server that is a datasource for the portal. The trigger may go to a linking framework which might determine that the portal event is linked to a work item in an artifact store. The link server may consequently message the artifact store to store a work item for the change notice and may message the forms framework to begin a new change notice workflow. The workflow engine might then perform an initial activity of the workflow by sending to the user a form for filling in the details of the work item (the details of the change notice). The user may receive the form, fill it out, and fill in the change notice. The filling in of the change notice may cause the artifact store to notify the link framework that the change notice has been updated. The link server then messages the workflow engine, and so on, until the change notice process is complete. As can be seen, the stack components play or execute the package as a cohesive unit, even though they may be stand alone or autonomous components, each capable of being installed and used independent of the others.

Figure 7:
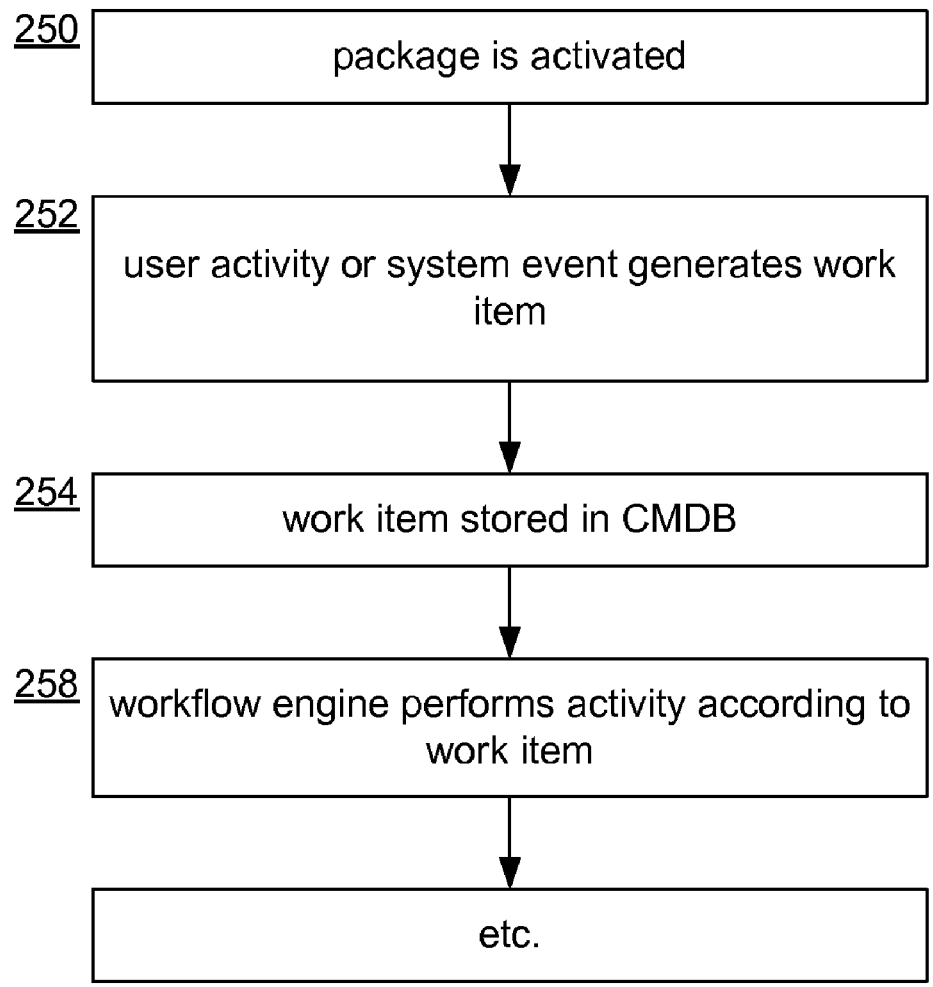
FIG. 7 shows an example process flow of a technology stack as it plays an example package.

FIG. 7 shows an example process flow of a technology stack as it plays an example package. Once a package has been played or activated 250, user activity or a system event may, for example, generate 252 a work item or other artifact representation. Some examples of user activity are sending an email to an email address configured by the package, accessing a portal page or submitting data entered in a form (possibly defined by the package), etc. Examples of system activity are alerts from management systems such as MOM or SMS, or messages generated by a workflow activity, or other automated occurrences on an IT system that are received or recognized by the IT system's technology stack. The generation 252 of a work item results in the work item being stored 254 in a CMDB or other artifact store. A component in the technology stack generates a workflow activation. The workflow engine then performs an activity in the linked workflow instance according to the triggering work item. These are only a few examples of how different components in a technology stack, once configured with a package, can cooperate to perform a process encoded by a package.

Figure 8:
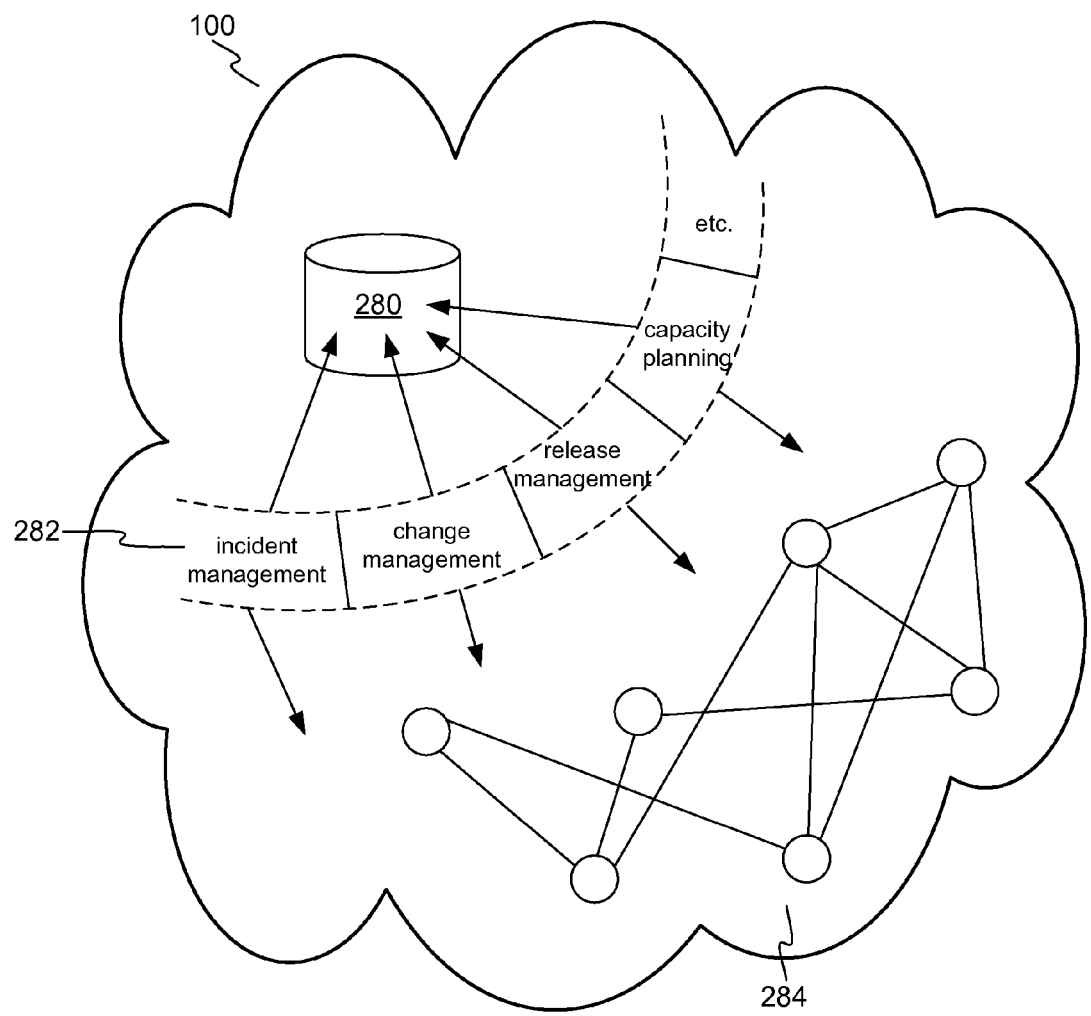
FIG. 8 shows a Configuration Management Database (CMDB).

FIG. 8 shows a Configuration Management Database (CMDB) 280. As noted above, a CMDB is a preferred (but not required) type of database for serving as an artifact store 110. A CMDB stores representations of Configuration Items, or CIs (for convenience, a representation of a CI and a CI itself will be used interchangeably). A CI is usually some IT component that is subject to IT configuration management control. Under ITIL, a CI represents objects like services, assets, users, locations, and organizations, to name a few examples. A life cycle of a CI is often driven by change orders (discussed in the next section). Out-of-the-box artifact templates can be provided to authors to make it easy for authors to write packages that use CIs for common artifacts such as computers and applications. Authors can add new types or extend existing types.

Relationships are also usually found in a CMDB. Work Items and CIs can be associated with each other or among themselves by relationships of various types such as containment, ownership, service dependency, causality, etc. In a CMDB, a CI can be composed of other CIs. CIs can vary widely in complexity and type, and can range from an entire system (including hardware, software, and documentation) to a single software module or a minor hardware component. A CI may have attributes, such as the CI's name, description, location, detailed technical configuration settings, options, and so on. In sum, a CMDB is a database that contains relevant details of each CI and details of relationships between CIs. The database can include information about a CI such as its copy and serial number, category, status, version, model, location, responsibility, or historical information about the item, to name a few examples.

A CMDB may be preferred because many IT processes deal with IT artifacts and relationships which are conveniently stored in a CMDB. As seen in FIG. 8, IT management functions 282 such as incident management, change management, release management, etc., can use CMDB 280 as a point of information exchange and persistence while managing an IT infrastructure 284. Furthermore, most decision making in an IT management function 282 is reasoned over these artifacts and relationships, and automation of a process will usually manipulate representations of these artifacts and relationships. A CMDB may also provide a well defined baseline system model that is both portable and extensible. Furthermore, over time, more management products will begin to use CMDBs, and in particular, SDM-based CMDBs, which may ease interconnectivity with other products or stack components.

Whether a CMDB is used or not, the artifact store 110 preferably has certain characteristics. Preferably, it should be object-relational. That is, the concepts of classes, relationships, composition, grouping and constraints will be beneficial. Furthermore, given that packages in effect extend an existing technology stack, it is helpful if the artifact store 110 allows for extensibility and inheritance. Therefore, authors of new packages can continue to define new classes and relationship types, possibly building upon those defined in other packages or templates. Also, sub-classing from pre-defined abstract classes like Configuration Item (CI), Managed Entity, Service, Asset and Network device or relationship type like client-server, can decrease the work needed to author a package.

Figure 9:
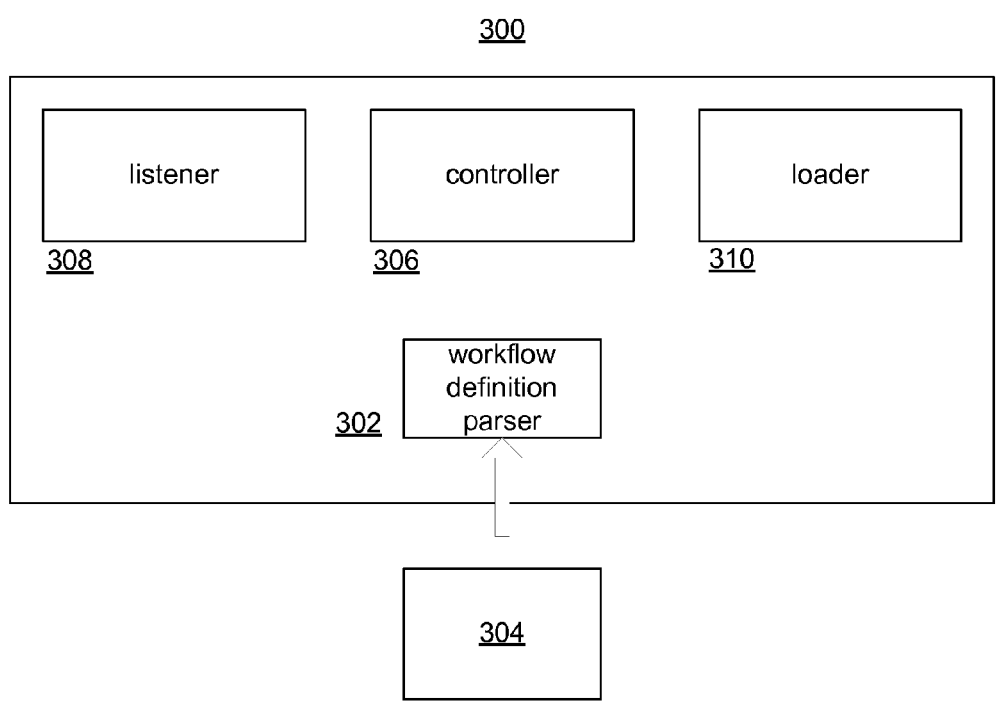
FIG. 9 shows an example workflow engine.

FIG. 9 shows an example workflow engine 300. As noted above, the workflow framework 114 can be realized using any of various existing workflow engines. The workflow engine 300 in FIG. 9 is intended only to give an example of how some workflow engines are arranged and function. The workflow engine 300 has a parser 302 which parses a new workflow definition 304. A controller 306 is a unit that executes instances of the workflow 304. The controller 306 manages the workflow's subjects, executes the workflow's activities, calls listeners, listens to events, handles timeouts, performs logging, and so on. A listener 308 can be implemented as a synchronous activity and is called by the controller 306 when its preconditions are met. The listener 308 listens for the workflow's incoming events. A loader 310 loads the workflow's subjects, by id, from a persistence store such as CMDB 280.

Figure 10:
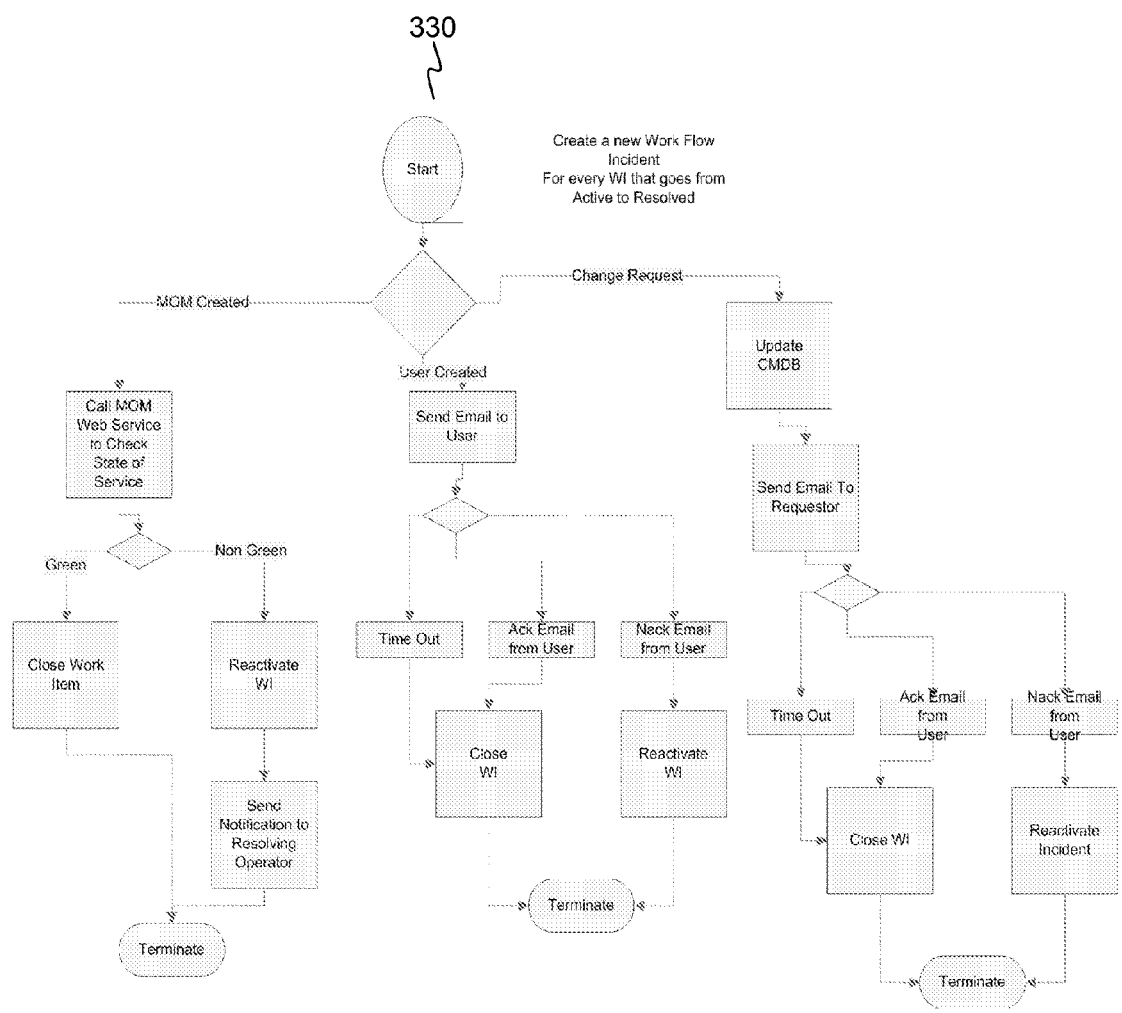
FIG. 10 shows an example workflow for handling incidents.

FIG. 10 shows an example workflow 330 for handling incidents. The workflow 330 is typical of the type of structured process that can be implemented using a package. Activities 332 (defined in the workflow portion of a package) are the nodes of the workflow 330. The subjects of the workflow 330 include Work Items, users, emails, etc. Any of the activities 332 can be triggered by some other component of a technology stack. Other types of activities might include sending tasks, invoking a service, sending notifications to people, manipulating artifacts, or manipulating an artifact of another stack component by going through the link server (which may have a reference to the artifact). A package's workflow code portion may also include information defining or describing what triggers a particular instance of the workflow. A package's workflow code portion should also describe the flow logic, i.e., the paths and conditions for flow between activities. Consider some examples of how a workflow can interact with other stack components. A workflow might retrieve, create, update, or delete work items and artifacts in a CMDB. A workflow can interact with external systems via a linking framework, and, for example, execute a task on a service monitored by a management component (e.g., MOM). A workflow might also email or by other means send out a notification. A workflow can even annotate a knowledge article with specific information.

As noted above, a package should be able to configure a workflow engine such that a workflow described in the package can be automatically created, executed, and monitored. A workflow can involve anything from simple incident handling automation, to user defined, long running and complex workflows. As discussed in the next section, package authors can define workflows for IT processes such as change authorization, escalation, notification, incident handling, asset life cycle mgmt, etc. A baseline or standard package (used by most authored packages) can provide templates based on standard operations found in MOF, for example.

As also noted above, WWF can be used as a workflow framework. However, to avoid having to write code, authoring can be performed in the Visual Studio workflow designer. Workflow types can be tied to a state change event of a work item or artifact. A specific state change, for example setting the state of a problem to "resolved", can initiate a new instance of a workflow to handle problem resolution. The context of a workflow can include the work item and therefore the logic in the workflow can access its properties or properties of associated artifacts, e.g., the email address of the owner of a service affected by the problem. A library of out-of-thebox standard workflow activities can be provided to manipulate artifacts, including activities like resolve-incident, escalate-incident, update-incident, update-CMDB, etc. A palette of standard workflow activities can be provided in the WWF designer. These might include activities like sending email, escalating bugs, or deploying software by calling linked products like MOM, SMS, Exchange, SharePoint or TFS. With this approach, package authors can create predefined processes by dragging and dropping activities, without necessarily having to write code.

FIG. 11 shows markup 350 for declaratively defining a workflow. The markup 350 in this example is written in Extensible Application Markup Language (XAML). The markup 350 is an example of the type of code that can be the code portion that is extracted from a package and plugged into a workflow framework.

As discussed above, a technology stack can include a knowledge framework that packages can use to supplement a process with related knowledge. The knowledge framework is ideally more than just a collection of documents; rather, the knowledge framework should have knowledge management functions such as creating an index, allowing searches, associating related articles, etc. There should be an ability to follow relationships between articles and to know what articles are related to a given article in a given context such as the context of a particular package. Work items like bug reports, incidents, or problems may have a taxonomy that will indicate purpose or context. For example, a work item might have a field indicating that the work item is a request for password reset. There may be some information in the work item's package that indicates that there is some related piece of knowledge. That information can be a link linking the work item to a taxonomy. If a user needs to know about how to request a password change, then the user can acquire knowledge indicating that, for example, when requesting a password, email needs to be sent to the user's manager or whatever steps need to be taken according to the encoded process. In knowledge-intense usage scenarios, there can be a workflow or package that defines a lifecycle of knowledge, for example, some person or role decides there is a need for an article for a topic, some person or role writes a draft, somebody reviews it, somebody puts it in production, etc. A knowledge framework can be implemented using commercially available products such as Microsoft SharePoint, databases with web front ends, Factiva, AskMe, SiteScape, and so on.

Figure 12:
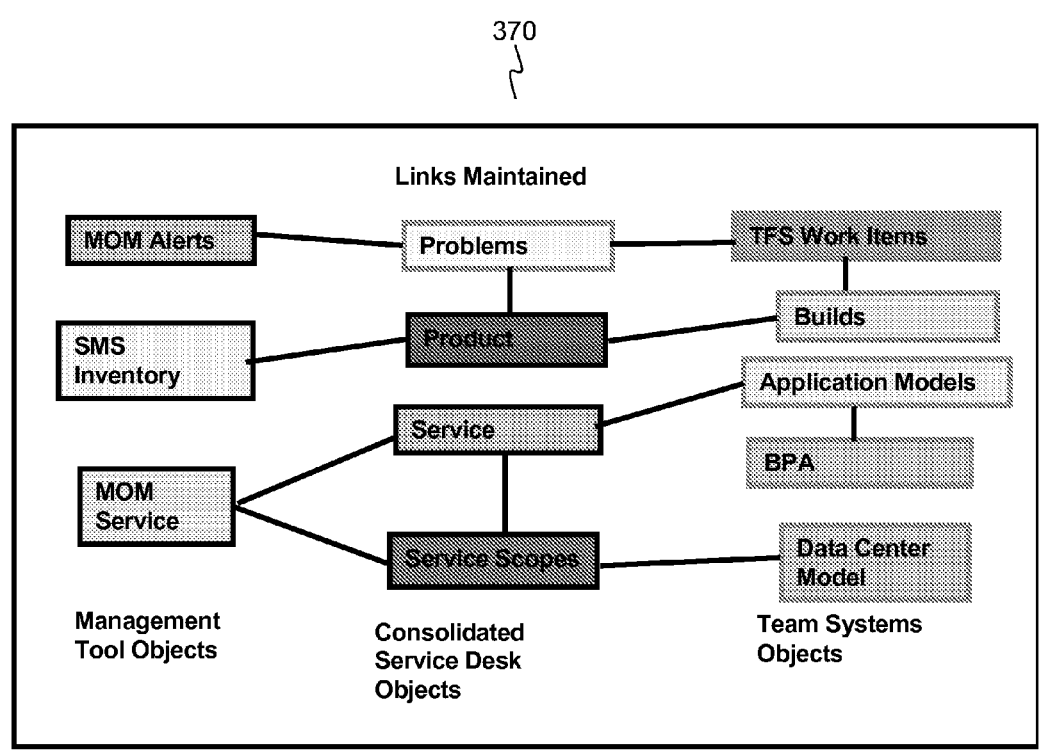
FIG. 12 shows examples of work items, artifacts, alerts, and other things that can be linked by a link server or linking framework.

FIG. 12 shows examples 370 of work items, artifacts, alerts, and other things that can be linked by a link server or linking framework. A linking framework can be used to create new connectors between new data types or classes. Depending on the solution space, other external stores can be connected or linked to. Linking may also be possible when there is a web service sitting on top of a stack component. In this case, it may be easy to declaratively express some linking and translations between linked items. In other words, a linking framework can provide the ability to link, exchange/synchronize, and map artifacts corresponding to one component with artifacts corresponding to another component (or IT management platform such as MOM or SMS). A TFS linking and routing server (mentioned earlier) can be used to connect systems. Artifacts and their relationships are registered at the linking server. In one embodiment, when these artifacts are available via a web service, the link server will be able to maintain the relationships and locations of these artifacts. Connectors for MOM, SMS and TFS connectivity can be authored or used as provided in a standard template library. In a simple embodiment, a link may be an association between a first unique identifier for a first object/artifact and a second unique identifier for a second object/artifact. In this embodiment, the links between the examples 370 would be a set of associations between pairs of unique identifiers that correspond to the examples 370.

As mentioned above, in one embodiment the technology stack is extensible. Thus, if a new package defines new classes, new artifacts, new types of activities, links between artifacts, new workflows, and so on, the stack components can learn and adapt to this new information. The stack components are reconfigured or extended according to the new information from the package. The stack components preferably have extensible APIs or abstraction layers that can be used to extend their functionality. These features of a technology stack can make it easier for a package to serve as a self-contained encoding of a process and related metadata that allows the definition of the process to be cleanly separated from the technology stack that automates the process.

Package Features and Examples of Processes

It should be noted that a package can serve as an external representation or model of a process that can be plugged into an operating environment or technology stack; there is a distinction between the technology stack and the authoring environment and the package itself. A same package can be plugged in to different technology stacks of different IT systems. A package can bring in new links, new workflows that have work occurring in different places in the stack, new documents and links thereto, and new forms. Furthermore, this information can be encoded in declarative fashion. In other words, an author can, in a package, declare a form, e.g., define placement of a dropdown menu in a blog, define a text field at another place, define a box at another place, declare that the dropdown will attach to a data source selected from a declared list of choices, declare that interface elements will limit what they display according to a selection choice, etc. This type of information can be expressed in a stack or operating environment that will perform it. Similarly, reports can be declared in the abstract rather than being hardcoded.

In some embodiments, packages are metadata driven solutions. Given a technology stack where a solution is to be developed, it might be possible to add a new data type to a stack component. However, that step alone might not be practical because now a workflow, for example, might not work because it won't have the right data types; an author might have to go into an existing workflow to modify the workflow's data types to be able to handle the new data type, for example, to know about a new attribute that was added. Similarly, existing forms may not be able to "play" that data type right away because the form author didn't even know about the attribute. Thus, by tying these things together in a package, a package can be a self-contained encoding of a process; it can be dropped into a technology stack and the functionality and data that it describes become active throughout the technology stack. This is particularly feasible where the pieces of the technology stack understand the metadata language in the package and are therefore able to together "play" the package as a cohesive unit. To explain further, a package can inform a stack that there are new things with new attributes and so forth, and the package can link those new things to other things in various parts of the system. Then, at the stack level, the package can be authored under the assumption that those linkable new things can be manipulated across the technology stack. For example, a new workflow with activities can manipulate the new things, or triggers in a component can invoked when a new thing is changed in a certain way.

To explain even further, consider that there are various software products available such as artifact stores (e.g., object oriented databases, CMDBs, etc.), forms frameworks (e.g., Office 12), workflow engines (e.g., WWF), information worker productivity suites, and others discussed above. These kinds of products (stack components) are converging in some ways. For example, many are or will have object models and functionality that can be extended using declarative code such as SDM or other XML based modeling languages. In other words, they can be configured by declarative code which might be in a same language for different components. However, these different components of an organization's technology stack have not previously been programmed (configured) or extended as a cohesive unit. According to some embodiments described herein, portable packages can now be used to "wire together" these components by taking advantage of their common ability to have their object models declaratively extended using a modeling language such as XML, SDM, or other languages, whether standard or non-standard.

Just as a programming language may have a set of standard libraries, a technology stack may have a set of standard packages which other packages can reference and use or extend. These standard packages can be focused on particular scenarios and may define basic artifacts, activities, links, etc. relevant to such scenarios, which are discussed below.

In the area of IT management, service management scenarios can be automated using packaged portable solutions. Processes for call management, which might touch many stack components, can be encoded; incoming "calls" via phone, chat, email or even a web can be integrated with call queue management, Computer Telephone Integration (CTI), Intelligent Voice Response (IVR), auditing, auto form population, and presence. Incident management scenarios can also be encoded, for example, incident tracking, which involves managing the state transitions and ownership of an incident through its life cycle. An incident management process can include automatic population of taxonomy, association of service and asset with a problem and visibility of knowledge, pre-discovery of asset data, and change history. Request management processes can also be encoded in packages. Processes which may involve handling requests for information and hardware or software upgrades. Service management process packages can be integrated with service monitoring processes, for example, by automatically generating incidents from an event or performance management system such as MOM or an external Service Desk. Problem management solutions can also be automated. Such packages can involve recognizing incidents as symptoms of an underlying problem, providing visibility of configuration, topology, knowledge, and commonality between incidents to help them resolve issues. Another type of service management process is root cause analysis. These types of processes use interdependency maps in a CMDB and current states of services and assets to automatically recognize underlying authentic problems. Service level management processes can be encoded in a package. These may automate incident prioritization, escalation, notification possibly tied to Service Level Agreements (SLAs), or setting of fine-grained SLAs by service and problem type. Notification and book keeping solutions can be stored in a package. For example, such a package might automate a process of record keeping in handling incidents and sending of required notifications to stake holders at appropriate times. Another example is bug escalation, in which case a problem deemed to be a bug is escalated to through a bug tracking system, such as TFS. Another type of service management type of solution package is related to knowledge usage and upkeep, where, based on incident classification and pre-collected configuration data, analysts are presented with appropriate corresponding knowledge, possibly based on ratings in a knowledge base. Higher tier analysts may regularly update knowledge to stem high volume issues.

Change management is another area that has processes that can be encoded into packages. Mismanaged IT change is a major cause of incidents and down time in an IT system. Change management processes are processes used to introduce changes in a controlled manner so as to minimize downtime. The basic item of change is often referred to as a change order, and the basic unit of item tracked through changes is called a Configuration Item, or CI (discussed above). A CI can be either a managed entity or a relationship, which are parts of a model based management approach. However a CI can also be a policy, a user group, or a contract and related relationships. Some specific encodable change management scenarios or processes include the following. Change authorization and approvals, which can be structured as driving a workflow from creation to completion of a change order, securing requisite authorization and approvals from stake holders (e.g., risk managers, budget managers, schedulers, service owners, and end users). Processes for change management can be authored or customized. Change notification processes can be authored, which can keep affected parties informed about an impending change, via email, portal etc. Impact analysis processes can be encoded to helping risk managers ass the impact (or risk) of making a requested change across one or more services. Such a process can be automated by taking advantage of relationships in a CMDB. A change scheduling process can be authored, which may include helping schedulers figure out proper opportunities to affect a change with least adverse impact, based possibly on change windows, service schedules, and availability of required personnel. Configuration auditing processes can also be packaged, such processes can, for example, include comparing configuration information with real world information scanned using SMS Desired Configuration Management (DCM) and physical inventory tools.

Processes for performance management and security management can also be captured in a process package. Examples of security management processes include alerts in combination with investigation and notification activities, automated analysis leading to recommended knowledge being provided to an administrator, and others.

Processes related to asset management can also be captured in portable stack-pluggable packages. Capital equipment decisions are often based on Total Cost of Ownership (TCO) reports that take into account service information. Such decisions can drive changes through change management. More specifically, an asset and configuration tracking process can be used to track, over time, CIs such as services, assets, users, configurations, policies, and their associations to each other. This can allow adjunct processes such as querying for ownership of an asset, where an asset is installed, which service does an asset participate in, or who should be called if an asset breaks. Automated execution of change orders keeps this data up to date, preferably in an enterprise artifact store. Another encodable asset management process is software license compliance management, including automated checking for existence and usage of software in an environment and taking actions to decrease costs and licensing risks. A TCO tracking process can report service and change costs over time for a particular service or an asset. The information can be used to make decisions around billing, outsourcing, capital goods and vendor selection.

CONCLUSION

In sum, in one or more embodiments, a single plug-and-play package (which can refer to, and thus logically include, other plug-and-play packages) can have the ability to drive a stack of components to deliver orchestration of a complete IT/Business process involving people and automation on other connected products (outside the stack), in a consistent fashion. The components of the stack may or may not directly communicate with each other, given the nature of the components. But, all of the relevant components can collaborate. Notably, a declarative configuration of a stack component (e.g., a form, a workflow, a class of artifact) can be expressed with the knowledge of the behavior of an underlying component (e.g., a CMDB or a workflow engine) because of the knowledge of underlying declarative configurations, e.g., schema and work-flow-activities, because they happen to be in the same plug-and-play package.

Those skilled in the art will realize that storage devices used to store program instructions can be distributed across a network. For example a remote computer may store an example of a process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile and/or non-volatile computer or device readable medium. This is deemed to include at least media such as CD-ROM, magnetic media, flash ROM, etc., storing machine executable instructions (either prior to execution, during execution, or both), or source code, or any other information that can be used to enable or configure computing devices to perform the various embodiments discussed above. This is also deemed to include at least volatile memory such as RAM storing information such as CPU instructions during execution of a program carrying out an embodiment.

The invention claimed is:

1. A method of enabling plug-and-play automation of IT service management processes, the method performed by at least one computer taking steps of:
    encoding each of the IT service management processes as a plug-and-play package, wherein each plug-and-play package is configured to be plugged into IT technology stacks of different organizations and played by the IT technology stacks to automate the IT service management processes wherein the IT technology stacks comprise a workflow engine, a forms framework, a knowledge framework, and an artifact store, wherein each plug-and-play package is in the form of declarative code, and wherein the declarative code, when interpreted by the IT technology stacks, causes the forms framework and the knowledge framework to interact to perform at least a portion of the IT service management processes, and wherein the declarative code of at least one of the plug-and-play packages comprises a first portion of declarative code compatible with and capable of configuring a first IT stack component, and comprises a second portion of declarative code compatible with and capable of configuring a second IT stack component that is separate and autonomous from the first IT stack component, and wherein the declarative code of the at least one of the plug-and-play packages is configured to cause the first IT stack component and the second IT stack component to automate different parts of the IT service management processes; and
    making the packages available to the organizations.

2. A method according to claim 1, wherein the encoding further comprises encoding a first plug-and-play package to use an IT service management process encoded in a second plug-and-play package by including with the first plug-and-play package a reference to the second plug-and-play package.

3. A method according to claim 1, wherein the configuration information comprises information for configuring the workflow engine, the forms framework, the knowledge framework, and the artifact store.

4. A method according to claim 1, wherein one of the IT management processes comprises a call queue management process for managing one or more queues of calls.

5. A method according to claim 1, wherein one of the IT management processes comprises an incident management process configured to manage lifecycles of IT incidents.

6. A method according to claim 1, wherein one of the IT management processes comprises a request management process for handling user requests for information or upgrades of hardware or software.

7. A method according to claim 1, wherein one of the IT management processes comprises an IT change-management process for managing changes to IT systems.

8. A method according to claim 1, further comprising receiving, via a network from various of the organizations, requests for the packages, and sending the packages to the organizations via the network.

9. A method of distributing packages to different organizations or firms having IT infrastructures that include technology stacks, the method performed by at least one computer taking steps of:
    receiving requests from the organizations or firms for a package; and
    in response to the requests, sending, to the requesting organizations or firms, the requested package, wherein the package is in the form of declarative code declaring a process in terms of a workflow, forms for users to participate in automation of the process, and artifacts stored by an artifact store and that interact with the workflow or the forms, and wherein the package is configured to be plugged into the technology stacks of the organizations or firms and to configure the technology stacks to automate the process, and wherein the technology stacks comprise a workflow engine, a forms framework, and a knowledge framework, wherein the declarative code, when interpreted by the technology stacks, cause the forms framework and the knowledge framework to interact to perform at least a portion of the process, and wherein the declarative code comprises a first portion of declarative code compatible with and capable of configuring a first IT stack component, and a second portion of declarative code compatible with and capable of configuring a second IT stack component that is separate and autonomous from the first IT stack component, and wherein the declarative code is configured to cause the first IT stack component and the second IT stack component to automate different parts of the process.

10. A method according to claim 9, wherein the receiving and sending are performed via a data network.

11. A method according to claim 9, further comprising determining whether the requested package depends on another package and, when so determined, sending the another package to the requesting organizations or firms.

12. A method according to claim 9, wherein the package is structured according to a package schema, and wherein an organization or firm that receives the package uses the package schema to plug the received package into its technology stack.

13. A method of facilitating the configuring of technology stacks of various organizations to be capable of performing IT management processes, the technology stacks comprising software components that are capable of autonomous operation and that are also capable of interoperating with each other, the method performed by at least one computer taking steps of:

receiving requests from the various organizations; and in response to the requests, sending to the requesting organizations declarative code defining an IT management process, wherein the declarative code is configured to be plugged into the software components, and wherein the software components comprise a forms framework and a knowledge framework, wherein the declarative code, when interpreted by the software components, is configured to cause the forms framework and the knowledge framework to interact to perform at least a portion of the IT management process, and wherein the declarative code comprises a first portion of declarative code compatible with and capable of configuring a first IT stack component, and a second portion of declarative code compatible with and capable of configuring a second IT stack component that is separate and autonomous from the first IT stack component, and wherein the declarative code is configured to cause the first IT stack component and the second IT stack component to automate different parts of the IT management processes.

14. A method according to claim 13, further comprising sending to the organizations a schema defining structure for the declarative code.

15. A method according to claim 13, wherein at least a portion of the declarative code is implemented using an XML-based system modeling language.

16. A method according to claim 13, wherein the declarative code declares a workflow, artifacts, and forms to be used by the software components to implement the IT management process.

17. A method of using a schema to facilitate exchange of declarative business process definitions, the method performed by at least one computer taking steps of:

distributing, by a first business to other businesses, packages in the form of declarative definitions of different business processes;

plugging the distributed packages into technology stacks of the other businesses configuring, based on the declarative definitions of the plugged packages, the technology stacks for automating the corresponding different business processes, wherein the technology stacks comprise a forms framework and a knowledge framework, wherein the declarative definitions, when interpreted by the technology stacks, cause the forms framework and the knowledge framework to interact to perform at least a portion of the different business processes, and wherein the declarative definitions of each package comprise a first portion of declarative code compatible with and capable of configuring a first IT stack component, and a second portion of declarative code compatible with and capable of configuring a second IT stack component that is separate and autonomous from the first IT stack component, and wherein the declarative definitions are configured to cause the first IT stack component and the second IT stack component to automate different parts of the business different processes.

18. A method according to claim 17, further comprising digitally signing the packages before distributing the packages.

* * * * *